United States Patent
Xiao et al.

(10) Patent No.: US 12,548,798 B2
(45) Date of Patent: Feb. 10, 2026

(54) HYDROFLUOROCARBON (HFC)-BASED SAFE ELECTROLYTE FOR SECONDARY BATTERIES

(71) Applicant: Battelle Memorial Institute, Richland, WA (US)

(72) Inventors: Jie Xiao, Richland, WA (US); Bingbin Wu, Richland, WA (US); Wei Wang, West Richland, WA (US); Dianying Liu, Richland, WA (US); Ruozhu Feng, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 674 days.

(21) Appl. No.: 17/940,799

(22) Filed: Sep. 8, 2022

(65) Prior Publication Data
US 2024/0113340 A1    Apr. 4, 2024

(51) Int. Cl.
| | | |
|---|---|---|
| *H01M 10/0569* | (2010.01) | |
| *H01M 4/36* | (2006.01) | |
| *H01M 4/38* | (2006.01) | |
| *H01M 4/505* | (2010.01) | |
| *H01M 4/525* | (2010.01) | |
| *H01M 4/58* | (2010.01) | |
| *H01M 4/587* | (2010.01) | |

(Continued)

(52) U.S. Cl.
CPC ....... *H01M 10/0569* (2013.01); *H01M 4/364* (2013.01); *H01M 4/382* (2013.01); *H01M 4/386* (2013.01); *H01M 4/505* (2013.01); *H01M 4/525* (2013.01); *H01M 4/5825* (2013.01); *H01M 4/587* (2013.01); *H01M 8/02* (2013.01); *H01M 8/188* (2013.01); *H01M 10/0568* (2013.01); *H01M 10/4235* (2013.01); *H01M 50/105* (2021.01); *H01M 2004/027* (2013.01); *H01M 2004/028* (2013.01); *H01M 2300/0034* (2013.01); *H01M 2300/0037* (2013.01)

(58) Field of Classification Search
None
See application file for complete search history.

(56) References Cited

U.S. PATENT DOCUMENTS

| | | |
|---|---|---|
| 7,402,260 B2 | 7/2008 | Segawa et al. |
| 8,815,453 B1 | 8/2014 | Tsukamoto |

(Continued)

FOREIGN PATENT DOCUMENTS

| | | |
|---|---|---|
| CN | 113851711 A | 12/2021 |
| EP | 2830141 | 1/2015 |

(Continued)

OTHER PUBLICATIONS 1, 1,2,2,3,3,4-Heptafluorocyclopentane, available online at https://pubchem.ncbi.nlm.nih.gov/compound/3853245, date unknown.*

(Continued)

*Primary Examiner* — Anca Eoff
(74) *Attorney, Agent, or Firm* — Klarquist Sparkman, LLP

(57) ABSTRACT

An electrolyte composition comprising a solution comprising an active salt; and a solvent portion that comprises a first solvent and a second solvent, wherein the first solvent is a hydrofluorocarbon compound having a structure of $C_xH_yF_z$, wherein x is from 4 to 10, y is from 1 to 10, z is from 5 to 20, and the z:y ratio is from 2:1 to 10:1.

14 Claims, 12 Drawing Sheets

(51) Int. Cl.
  *H01M 8/02* (2016.01)
  *H01M 8/18* (2006.01)
  *H01M 10/0568* (2010.01)
  *H01M 10/42* (2006.01)
  *H01M 50/105* (2021.01)
  *H01M 4/02* (2006.01)

(56) References Cited

U.S. PATENT DOCUMENTS

| | | | |
|---|---|---|---|
| 9,947,961 B2 | 4/2018 | Bandhauer | |
| 11,063,297 B2 | 7/2021 | Newhouse et al. | |
| 2006/0078792 A1* | 4/2006 | Kim | H01M 10/0525 429/200 |
| 2007/0003838 A1* | 1/2007 | Kumashiro | H01G 11/06 429/324 |
| 2010/0266907 A1 | 10/2010 | Yazami | |
| 2011/0189549 A1* | 8/2011 | Sun | H01M 6/16 429/324 |
| 2016/0261005 A1 | 9/2016 | Rustomji et al. | |
| 2018/0108913 A1* | 4/2018 | Zhang | C08J 3/24 |
| 2020/0067130 A1 | 2/2020 | Rustomji et al. | |
| 2020/0266007 A1 | 8/2020 | Rustomji et al. | |

FOREIGN PATENT DOCUMENTS

| | | | | |
|---|---|---|---|---|
| JP | 2000223151 A | * | 8/2000 | |
| JP | 2004111359 A | * | 4/2004 | |
| JP | 2017091806 A | * | 5/2017 | |
| WO | WO-2014048505 A1 | * | 4/2014 | ........ H01M 10/0525 |

OTHER PUBLICATIONS 1,1,1,2,2,3,4,5,5,5-Decafluoropentane, available online at https://pubchem.ncbi.nlm.nih.gov/compound/2H_3H-Decafluoropentane, date unknown.*

Machine translation of JP 2004-111359 A, published on Apr. 8, 2004 (Year: 2004).*

Machine translation of JP2017-091806 A, published on May 25, 2017 (Year: 2017).*

Machine translation of JP2000-223151 A, published on Aug. 11, 2000 (Year: 2000).*

Rustomji et al., "Liquefied gas electrolytes for electrochemical energy storage devices," *Science*, 365(6345): 12 pages, Jun. 15, 2017.

Yin et al., "Fire-extinguishing, recyclable liquefied gas electrolytes for temperature-resilient lithium-metal batteries," *Nature Energy*, vol. 7, pp. 548-559, Jun. 16, 2022.

Yu et al., "Molecular design for electrolyte solvents enabling energy-dense and long-cycling lithium metal batteries," *Nature Energy*, vol. 5, pp. 526-533, Jun. 22, 2020.

International Search Report and Written Opinion for International Application No. PCT/US2023/031067, mailed Nov. 17, 2023, 13 pages.

* cited by examiner

DH based HFC electrolytes have stable cycling with anode free battery than carbonate electrolyte.

Capacity retention:
EL47C: 80% @550-560 cycle, 65%@1000 cycle
HCP104: 80% @630-650 cycle, 71%@1000 cycle
ELSi1: 80% @440-460 cycle, 50%@1000 cycle Developed HCPTFSI-3 electrolyte for NRFB 1M LiTFSI Acetonitrile Continuous burning HCPTFSI-3 safe electrolyte Flash in 1s and extinguished in 1s.

0.1 mol/kg TEMPO in LiTFSI/DME/HCP+10% FEC (1:1.5:3, mol ratio)

HYDROFLUOROCARBON (HFC)-BASED SAFE ELECTROLYTE FOR SECONDARY BATTERIES

ACKNOWLEDGMENT OF GOVERNMENT SUPPORT

This invention was made with government support under Contract DE-AC0576RL01830 awarded by the U.S. Department of Energy. The government has certain rights in the invention.

BACKGROUND

The state-of-art lithium-ion batteries (LIBs) deployed in consumer electronics, electrical vehicle and energy storage systems include highly flammable carbonate electrolyte, causing a high risk of fire/exploration. Fires from electrical vehicles and grid-level energy storage systems can be frequently seen from news reports. Beyond commercially-available LIBs, electrolytes reported in the literature also show high or low flammability depending on the recipe of the electrolyte. For examples, the localized high concentrated electrolyte (LHCE) applied in high energy-density lithium metal secondary battery shows low flammability and low flash point as the presence of fluoroether, like 1,1,2,2-tetrafluoroethyl-2,2,3,3-etrafluoropropylether (TTE). Ether or acetonitrile are popular solvents in nonaqueous redox flow batteries (NRFB), but are highly flammable.

SUMMARY

Disclosed herein is an electrolyte composition comprising a solution comprising:
an active salt; and
a solvent portion that comprises a first solvent and a second solvent, wherein the first solvent is a hydrofluorocarbon compound having a structure of $C_xH_yF_z$, wherein x is from 4 to 10, y is from 1 to 10, z is from 5 to 20, and the z:y ratio is from 2:1 to 10:1.

Also disclosed herein is a nonflammable electrolyte consisting essentially of:
an active salt; and
a solvent portion that comprises a first solvent and a second solvent, wherein the first solvent is a hydrofluorocarbon compound having a structure of $C_xH_yF_z$, wherein x is from 4 to 10, y is from 1 to 10, z is from 5 to 20, and the z:y ratio is from 2:1 to 10:1.

Further disclosed herein is a battery system, comprising:
an electrolyte composition as disclosed herein;
a cathode; and
an anode current collector in the absence of an anode, or an anode comprising lithium metal, sodium metal, potassium metal, an intercalation material, or a conversion compound.

Also disclosed herein is a nonaqueous redox flow battery system, comprising:
an anolyte;
a catholyte; and
an ion-exchange membrane or porous separator,
wherein at least one of the anolyte or the catholyte comprises an electrolyte composition as disclosed herein.

The foregoing will become more apparent from the following detailed description, which proceeds with reference to the accompanying figures.

DETAILED DESCRIPTION

I. Definitions and Abbreviations

Figure 1B:
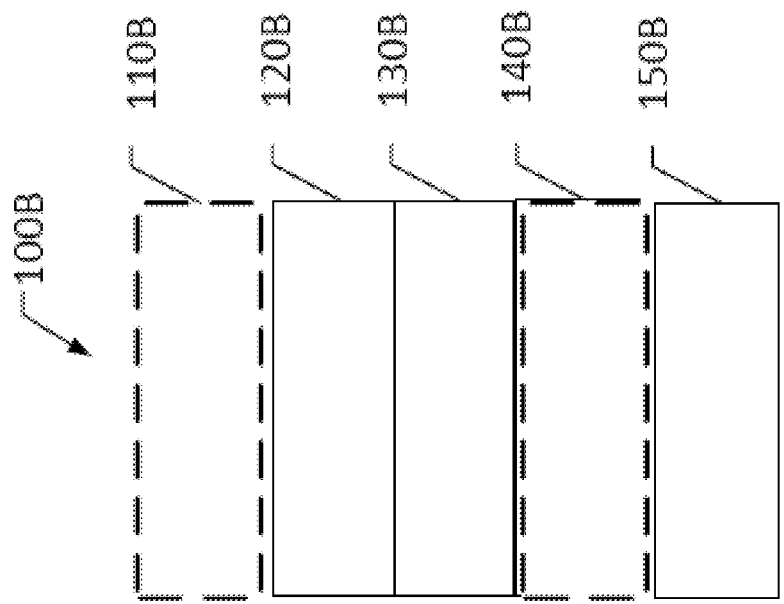
FIGS. 1A and 1B are schematic diagrams of one exemplary embodiment of a rechargeable battery comprising an anode (1A) and one exemplary embodiment of an anode-free rechargeable battery (1B).

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, molarities, voltages, capacities, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Although there are alternatives for various components, parameters, operating conditions, etc. set forth herein, that does not mean that those alternatives are necessarily equivalent and/or perform equally well. Nor does it mean that the alternatives are listed in a preferred order unless stated otherwise.

Definitions of common terms in chemistry may be found in Richard J. Lewis, Sr. (ed.), *Hawley's Condensed Chemical Dictionary*, published by John Wiley & Sons, Inc., 2016 (ISBN 978-1-118-13515-0).

In order to facilitate review of the various embodiments of the disclosure, the following explanations of specific terms are provided:

Additive: As used herein, the term "additive" refers to a component of an electrolyte that is present in an amount of greater than zero and less than or equal to 5 wt %.

Anode: An electrode through which electric charge flows into a polarized electrical device. From an electrochemical point of view, negatively-charged anions move toward the anode and/or positively-charged cations move away from it to balance the electrons leaving via external circuitry. In a discharging battery or galvanic cell, the anode is the negative terminal where electrons flow out. If the anode is composed of a metal, electrons that it gives up to the external circuit are accompanied by metal cations moving away from the electrode and into the electrolyte. When the battery is recharged, the anode becomes the positive terminal where electrons flow in and metal cations are reduced.

Capacity: The capacity of a battery is the amount of electrical charge a battery can deliver. The capacity is typically expressed in units of mAh, or Ah, and indicates the maximum constant current a battery can produce over a period of one hour. For example, a battery with a capacity of 100 mAh can deliver a current of 100 mA for one hour or a current of 5 mA for 20 hours. Areal capacity or specific areal capacity is the capacity per unit area of the electrode (or active material) surface, and is typically expressed in united of mAh cm$^2$.

Cathode: An electrode through which electric charge flows out of a polarized electrical device. From an electrochemical point of view, positively charged cations invariably move toward the cathode and/or negatively charged anions move away from it to balance the electrons arriving from external circuitry. In a discharging battery or galvanic cell, the cathode is the positive terminal, toward the direction of conventional current. This outward charge is carried internally by positive ions moving from the electrolyte to the positive cathode, where they may be reduced. When the battery is recharged, the cathode becomes the negative terminal where electrons flow out and metal atoms (or cations) are oxidized.

Cell: As used herein, a cell refers to an electrochemical device used for generating a voltage or current from a chemical reaction, or the reverse in which a chemical reaction is induced by a current. A battery includes one or more cells. The terms "cell" and "battery" are used interchangeably when referring to a battery containing only one cell.

Consisting essentially of: By "consisting essentially of" is meant that the electrolyte does not include other components that materially affect the properties of the electrolyte alone or in a system including the electrolyte. For example, the electrolyte does not include any additional solvents other than the recited hydrofluorocarbon(s), the second solvent(s), and, optionally, the flame retardant compound, or other additives in a significant amount (e.g., >1 wt %).

Coulombic efficiency (CE): The efficiency with which charges are transferred in a system facilitating an electrochemical reaction. CE may be defined as the amount of charge exiting the battery during the discharge cycle divided by the amount of charge entering the battery during the charging cycle. CE of Li∥Cu or Na∥Cu cells may be defined as the amount of charge flowing out of the battery during stripping process divided by the amount of charge entering the battery during plating process.

Depth of discharge (DOD): The term "depth of discharge" represents the percentage of the battery that has been discharged relative to the overall capacity of the battery.

DH: 1H,6H-dodecafluorohexane

DME: dimethoxyethane

EC: ethylene carbonate

EMC: ethyl methyl carbonate

End of life (EOL): The point at which a battery will hold only a set percentage of its original capacity. For example, 80% EOL means the point at which the battery still has 80% of the original capacity after being charged/discharged for a number of cycles.

Flammable: The term "flammable" refers to a material that will ignite easily and burn rapidly. As used herein, the term "nonflammable" means that an electrolyte, will not ignite or burn due to operation of an electrochemical device including the electrolyte. Flammability can be measured by determining the self-extinguishing time (SET) of the electrolyte, by determining whether the electrolyte ignites when exposed to direct contact with a flame, and/or by determining the flashpoint of the electrolyte. The SET is determined by a modified Underwriters Laboratories test standard 94 HB. An electrolyte is immobilized on an inert ball wick, such as a ball wick having a diameter of ~0.3-0.5 cm, which is capable of absorbing 0.05-0.10 g electrolyte. The wick is then ignited, and the time for the flame to extinguish is recorded. The time is normalized against the sample weight. If the electrolyte does not catch flame, the SET is zero and the electrolyte is nonflammable. Electrolytes having SET of <6 s/g (e.g., the flame extinguishes within ~0.5 s) are also considered nonflammable. Alternatively, an open container of the electrolyte may be contacted directly with a flame, e.g., a flame from a butane lighter. If the electrolyte does not ignite after 5 seconds of direct contact with the flame, then the electrolyte is nonflammable. An electrolyte also is considered nonflammable if it has a flashpoint>93° C. according to GHS classification criteria, e.g., as determined by ASTM D 3243, D 3278 and D 3828.

HCP: 1H,1H,2H-heptafluorocyclopentane

HFC: hydrofluorocarbon

Intercalation material: A compound capable of intercalating ions reversibly without irreversible change in its microstructure. For example, a lithium ion intercalation material is capable of intercalating lithium ions. One example of a lithium ion intercalation material is graphite, which is often used in lithium-ion batteries. Lithium ions intercalate into the carbon structure to form $LiC_6$. Lithium ions can also be extracted from $LiC_6$ to re-form graphite without irreversible change in its microstructure.

KFSI: potassium bis(fluorosulfonyl)imide

KTFSI: potassium bis(trifluoromethanesulfonyl)imide

LiBETI: lithium bis(pentafluoroethanesulfonyl)imide

LIFSI: lithium bis(fluorosulfonyl)imide

LITFSI: lithium bis(trifluoromethanesulfonyl)imide

LIBOB: lithium bis(oxalato)borate

LIDFOB: lithium difluoro(oxalato)borate

LHCE: localized high concentrated electrolyte $LIPF_6$: lithium hexafluorophosphate NaFSI: sodium bis(fluorosulfonyl)imide NaTFSI: sodium bis(trifluoromethylsulfonyl)imide NaBOB: sodium bis(oxalato)borate NRFB: nonaqueous redox flow battery PC: propylene carbonate Primary salt: The term "primary salt" when used with multiple-salt electrolytes, refers to the salt present in a greater concentration than any of the other salts in the electrolyte.

Separator: A battery separator is a porous sheet or film placed between the anode and cathode. It prevents physical contact between the anode and cathode while facilitating ionic transport.

Soluble: Capable of becoming molecularly or ionically dispersed in a solvent to form a homogeneous solution. As used herein, the term "soluble" means that a salt has a solubility in a given solvent of at least 1 mol/L (M, molarity) or at least 1 mol/kg (m, molality).

Solution: A homogeneous mixture composed of two or more substances. A solute (minor component) is dissolved in a solvent (major component). A plurality of solutes and/or a plurality of solvents may be present in the solution.

TEMPO: (2,2,6,6-Tetramethylpiperidin-1-yl)oxyl

TTE: 1,1,2,2-tetrafluoroethyl-2,2,3,3-etrafluoropropyl-ether

II. Nonflammable Electrolytes

A. Solvents

The first solvent is a hydrofluorocarbon compound having a structure of $C_xH_yF_z$, wherein x is from 4 to 10, y is 1 to 10, z is from 5 to 20, and the z:y ratio is from 2:1 to 10:1.

In certain embodiments, x is 5. In certain embodiments, x is 6.

In certain embodiments, y is from 2 to 4.

In certain embodiments, z is from 6 to 10.

In certain embodiments, the z:y ratio is from 5:1 to 2:1.

In certain embodiments, the hydrofluorocarbon is a linear or branched-chain hydrofluorocarbon.

In certain embodiments, the hydrofluorocarbon is a cyclic hydrofluorocarbon.

Illustrative hydrofluorocarbons include, for example, a fluoropentane (e.g., 2H,3H-decafluoropentane), a fluorocyclopentane (e.g., 1H,1H,2H-heptafluorocyclopentane (denoted herein as HCP), 1H,2H-octafluorocyclopentane), a fluorohexane (e.g., 1H,6H-dodecafluorohexane (denoted herein as DH)), a fluorocyclohexane (e.g., 1,1,2,2,3,3,4,4,5,5-decafluorocyclohexane), a fluoroheptane (e.g., 1H,7H-perfluoroheptane), a fluorooctane (e.g., 1H,8H-perfluorooctane), a fluoroalkene (e.g., 1,1,1,2,3,4,5,5-octafluoro-2-pentene, 1,1,1,4,4,5,5,6,6,6-decafluorohex-2-ene,). In certain embodiments, the solvent is HCP, DH or a mixture thereof.

In certain embodiments, the hydrofluorocarbon is present in the electrolyte composition in an amount of 8 to 80 mol %, more particularly 50 to 60 mol %, based on the total moles of all the electrolyte components.

In any of the foregoing or following embodiments, the hydrofluorocarbon may comprise from 10 vol % to 90 vol % of the solvent portion of the electrolyte. In some embodiments, the solvent portion comprises 20 vol % to 50 vol %, 70 vol % to 75 vol %, or 75 vol % to 85 vol % of the hydrofluorocarbon.

The hydrofluorocarbon is a liquid at normal atmosphere pressure and can be easily deployed in electrolytes.

In any of the foregoing or following embodiments, the electrolyte further comprises at least one second solvent. In some embodiments, the second solvent comprises an organic carbonate solvent, an ether solvent, an ester solvent, an orthoformate solvent, a phosphate solvent, a phosphite solvent, a phosphonate solvent, a phosphazene solvent, an organic sulfoxide, a sulfone, an organic nitrogen-containing solvent, or any combination thereof. Suitable second solvents include, but are not limited to, ethylene carbonate (EC), dimethyl carbonate (DMC), vinylene carbonate (VC), fluoroethylene carbonate (FEC), difluoroethylene carbonate (DFEC), trifluoroethylene carbonate (TFEC), vinyl ethylene carbonate (VEC), 4-methylene ethylene carbonate (MEC), propylene carbonate (PC), ethyl methyl carbonate (EMC), diethyl carbonate (DEC), methyl 2,2,2-trifluoroethyl carbonate (MFEC), dimethoxyethane (DME), 1,3-dioxolane (DOL), tetrahydrofuran (THF), allyl ether, triethyl phosphate (TEP), trimethyl phosphate (TMP), tributyl phosphate, triphenyl phosphate, tris(2,2,2-trifluoroethyl) phosphate, bis (2,2,2-trifluoroethyl) methyl phosphate, triphenyl phosphite, tris(2,2,2-trifluoroethyl) phosphite; dimethyl methylphosphonate, diethyl ethylphosphonate, diethyl phenylphosphonate, bis(2,2,2-trifluoroethyl) methylphosphonate; hexamethylphosphoramide; hexamethoxyphosphazene, hexafluorophosphazene, dimethyl sulfoxide (DMSO), dimethyl sulfone (DMS), ethyl methyl sulfone (EMS), ethyl vinyl sulfone (EVS), tetramethylene sulfone (TMS), trifluoromethyl ethyl sulfone (FMES), trifluoromethyl isopropyl sulfone (FMIS), trifluoropropyl methyl sulfone (FPMS), diethylene glycol dimethyl ether (diglyme), triethylene glycol dimethyl ether (triglyme), tetraethylene glycol dimethyl ether (tetraglyme), methyl butyrate, ethyl propionate, gamma-butyrolactone, acetonitrile (AN), succinonitrile (SN), adiponitrile, triallyl amine, triallyl cyanurate, triallyl isocyanurate, or any combination thereof. In some embodiments, the second solvent is an organic carbonate solvent. In certain embodiments, the solvent is DME. In certain embodiments, the solvent is EC, PC, or a mixture thereof.

In any of the foregoing or following embodiments, the second solvent may comprise from 10 vol % to 90 vol % of the solvent portion of the electrolyte. In some embodiments, the solvent portion comprises 50 vol % to 80 vol %, 25 vol % to 30 vol %, or 15 vol % to 20 vol % of the second solvent.

The electrolyte has a high flash point (e.g., at least about 93° C.), and is non-flammable.

The active salt is a salt, or combination of salts, which participates in the charge and discharge processes of a cell including the electrolyte. The active salt comprises a cation that is capable of forming redox pairs having different oxidation and reduction states, such as ionic species with differing oxidation states or a metal cation and its corresponding neutral metal atom. In some embodiments, the active salt is an alkali metal salt, an alkaline earth metal salt, or any combination thereof. The active salt may be, for example, a lithium salt, a sodium salt, a potassium salt, a magnesium salt, a mixture of lithium salts, a mixture of sodium salts, a mixture of potassium salts, or a mixture of magnesium salts. Advantageously, the active salt is stable towards an alkali metal, alkaline earth metal, carbon-based, silicon-based, carbon/silicon-based, tin-based, or antimony-based anode. Exemplary salts include, but are not limited to, LiFSI, LiTFSI, LiFTFSI, LiBETI, NaFSI, NaTFSI, NaBETI, LiBOB, sodium bis(oxalato)borate (NaBOB), $LiPF_6$, $LiAsF_6$, $LiBF_4$, $LiCF_3SO_3$, $LiClO_4$, LiDFOB, LiI, LiBr, LiCl, LiSCN, $LiNO_3$, $LiNO_2$, $Li_2SO_4$, and combinations thereof.

The electrolyte composition disclosed herein may have an active salt concentration, particularly a Li salt, concentration of between 0.5 M and 2.5 M salt concentration, preferably between 1 M to 2 M.

In certain embodiments, the electrolyte composition includes a compatibility agent, such as $LiNO_3$, that functions as an effective film-forming additive and can form a good solid electrolyte interphase (SEI) film on Li metal anodes, thus protecting the Li metal anode and improving the cycling performance. Other components, such as $RNO_3$ (R is cesium (Cs), rubidium (Rb), lanthanum (La), potassium (K)), pyrrole, triphenylphosphine, LiX (X=Br, I) and $InI_3$ can also incorporated as additives in these hydrofluorocarbon-based electrolytes.

The electrolyte composition may have a viscosity of 1 to 10 cp at 30° C., more preferably 4 to 6 cp at 30° C.

III. Batteries

Embodiments of the disclosed nonflammable electrolytes are useful in batteries (e.g., rechargeable batteries), sensors, and supercapacitors. Suitable batteries include, but are not limited to, lithium metal batteries, lithium-ion batteries, lithium-sulfur batteries, lithium-oxygen batteries, lithium-air batteries, sodium metal batteries, sodium ion batteries, sodium-sulfur batteries, sodium-oxygen batteries, sodium-air batteries, potassium metal batteries, potassium ion batteries, and nonaqueous redox flow batteries.

Figure 1A:
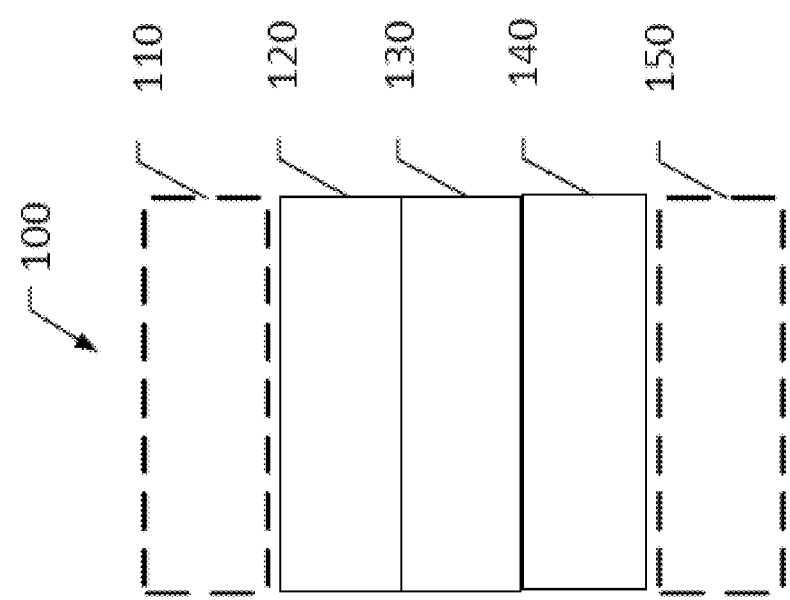

In some embodiments, a rechargeable battery comprises a nonflammable electrolyte as disclosed herein, a cathode, an anode, and optionally a separator. FIG. 1A is a schematic diagram of one exemplary embodiment of a rechargeable battery 100 including a cathode 120, a separator 130 which is infused with a nonflammable electrolyte as disclosed herein, and an anode 140. In some embodiments, the battery 100 also includes a cathode current collector 110 and/or an anode current collector 150.

In certain embodiments, a rechargeable battery is anode-free. As shown in FIG. 1B, the anode-free rechargeable battery 100B includes a cathode 120B, a separator 130B which is infused with a nonflammable electrolyte as disclosed herein, and an anode current collector 150B. In some embodiments, the battery also includes a cathode current collector 110B. In some embodiments, the cathode 120B is a Li-, Na-, or K-containing cathode, which serves as a metal source during a charging process of the battery. During the charging process of the battery 100B, an anode 140B comprising lithium, sodium, or potassium metal is formed in situ on the surface of the anode current collector 150B facing the separator 130B. By "in situ" is meant that the anode forms during a charging process of the battery. The anode active material 140B is at least partially consumed during a discharging process of the battery 100B. In other words, Li, Na, or K metal deposited onto the current collector 150B to form an anode 140B during charging is oxidized during discharge to produce $Li^+$, $Na^+$, or $K^+$ cations. In some embodiments of an anode-free rechargeable battery, all or substantially all (e.g., at least 90 wt % or at least 95 wt %) of the anode active material is consumed during the discharging process. In an assembled state having charge, the rechargeable battery 100B comprises an anode current collector 150B, a cathode 120B, a separator 130B, an electrolyte as disclosed herein (not shown), and an in situ-formed anode on a surface of the anode current collector 150B facing the separator 130B. In an assembled uncharged state, the rechargeable battery 100B comprises the anode current collector 150B, the cathode 120B, the separator 130B, and the electrolyte (not shown). In the assembled uncharged state, the rechargeable battery 100B does not comprise an anode.

Figure 2:
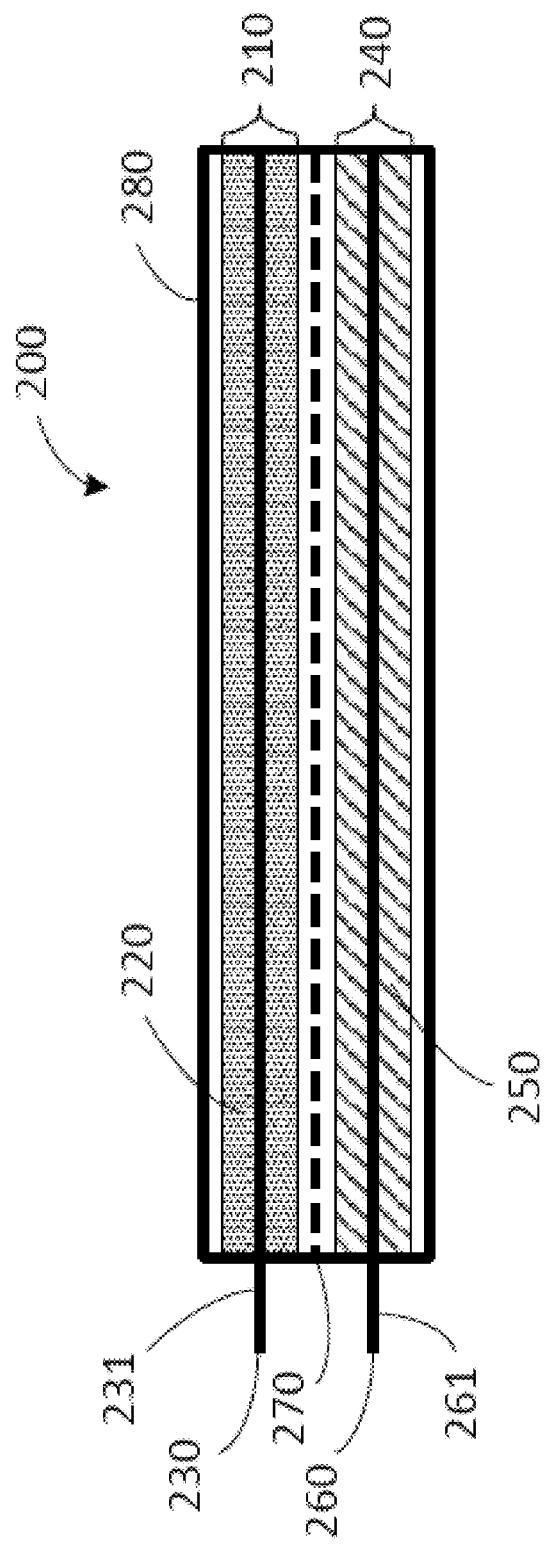
FIG. 2 is a schematic side elevation view of a simplified pouch cell.

In some embodiments the rechargeable battery is a pouch cell. FIG. 2 is a schematic side elevation view of one embodiment of a simplified pouch cell 200. The pouch cell 200 comprises an anode 210 comprising anode material 220 (e.g., lithium metal, sodium metal, potassium metal, an intercalation material, or a conversion compound) and an anode current collector 230, a cathode 240 comprising cathode material 250 and a cathode current collector 260, a separator 270, and a packaging material defining a pouch 280 enclosing the anode 210, cathode 240, and separator 270. The pouch 280 further encloses a nonflammable electrolyte as disclosed herein (not shown). The anode current collector 230 has a protruding tab 231 that extends external to the pouch 280, and the cathode current collector 260 has a protruding tab 261 that extends external to the pouch 280. In certain implementations, the pouch cell 200 is anode-free in an uncharged state. In such implementations, the pouch cell 200 does not include the anode material 220 in the assembled uncharged state; only the anode current collector 230 is present. The anode material 220 is formed in situ on a surface of the anode current collector 230 facing the separator 270 during a charging process of the assembled pouch cell. The anode material 220 is at least partially consumed during the discharging process.

The current collectors can be a metal or another conductive material such as, but not limited to, nickel (Ni), copper (Cu), aluminum (Al), iron (Fe), stainless steel, or conductive carbon materials. The current collector may be a foil, a foam, or a polymer substrate coated with a conductive material. Advantageously, the current collector is stable (i.e., does not corrode or react) when in contact with the anode or cathode and the nonflammable electrolyte in an operating voltage window of the battery. The anode and cathode current collectors may be omitted if the anode or cathode, respectively, are free standing, e.g., when the anode is metal or a free-standing film comprising an intercalation material or conversion compound, and/or when the cathode is a free-standing film. By "free-standing" is meant that the film itself has sufficient structural integrity that the film can be positioned in the battery without a support material.

In some embodiments, the anode is a metal (e.g., lithium, sodium, or potassium), an intercalation material, or a conversion compound. The intercalation material or conversion compound may be deposited onto a substrate (e.g., a current collector) or provided as a free-standing film, typically, including one or more binders and/or conductive additives. Typically, the substrate is Al foil. Suitable binders include, but are not limited to, polyvinyl alcohol, polyvinyl chloride, polyvinyl fluoride, ethylene oxide polymers, polyvinylpyrrolidone, polyurethane, polytetrafluoroethylene, polyvinylidene fluoride, polyethylene, polypropylene, styrenebutadiene rubber, epoxy resin, nylon, and the like. Suitable conductive additives include, but are not limited to, carbon black, acetylene black, Ketjen black, carbon fibers (e.g., vapor-grown carbon fiber), metal powders or fibers (e.g., Cu, Ni, Al), and conductive polymers (e.g., polyphenylene derivatives).

Exemplary anodes for lithium batteries include, but are not limited to, Li, $Mo_6S_8$, $TiO_2$, $V_2O_5$, $Li_4MnsO_{12}$, $Li_4TisO_{12}$, Si, C/Si composites, and anode free battery, e.g., directly use Cu foil as current collector and no active anode materials on it. In some embodiments, the anode is Li metal. Exemplary anodes for sodium batteries include, but are not limited to Na, $NaTi_2(PO_4)_3$, $TiS_2$, CuS, $FeS_2$, $NiCo_2O_4$, $Cu_2Se$, and $Li_{0.5}Na_{0.5}Ti_2(PO_4)_3$. In some embodiments, the anode is Na metal. Exemplary anodes for potassium batteries include, but are not limited to, K, carbon (e.g., graphite, carbon black, activated carbon, graphene), $K_2Ti_4O_9$, $K_2TisO_{17}$, $KTi_2(PO_4)_3/C$, $TiSe_2$, $MoS_2$, CoS, $Co_3O_4$—$Fe_2O_3/C$, $VSe_2$, dipotassium terephthalate, and 2,5-pyridinedicarboxylate. In some embodiments, the anode is potassium metal.

Exemplary cathode materials for lithium batteries include, but are not limited to, Li-rich $Li_{1+w}Ni_xMn_yCo_zO_2$ (x+y+z+w=1, 0≤w≤0.25), $LiNi_xMn_yCo_zO_2$ (NMC, x+y+z=1), $LiCoO_2$, $LiNi_{0.8}Co_{0.15}Al_{0.05}O_2$ (NCA), $LiN_{0.5}Mn_{1.15}O_4$ spinel, $LiMn_2O_4$(LMO), $LiFePO_4$ (LFP), $Li_{4-x}M_xTi_5O_{12}$ (M=Mg, Al, Ba, Sr, or Ta; 0≤x≤1), $MnO_2$, $V_2O_5$, $V_6O_{13}$, $LiV_3O_8$, $LiM^{C1}_xM^{C2}_{1-x}PO_4$ ($M^{C1}$ or $M^{C2}$=Fe, Mn, Ni, Co, Cr, or Ti; 0≤x≤1), $Li_3V_{2-x}M^1_z(PO_4)_3$ ($M^1$=Cr, Co, Fe, Mg, Y, Ti, Nb, or Ce; 0≤x≤1), $LiVPO_4F$, $LiM^{C1}_xM^{C2}_{1-x}O_2$ (($M^{C1}$ and $M^{C2}$ independently are Fe, Mn, Ni, Co, Cr, Ti, Mg, or Al; 0≤x≤1), $LiM^{C1}_xM^{C2}_yM^{C3}_{1-x-y}O_2$ (($M^{C1}$, $M^{C2}$, and $M^{C3}$ independently are Fe, Mn, Ni, Co, Cr, Ti, Mg, or Al; 0≤x≤1; 0≤y≤1), $LiMn_{2-y}X_yO_4$ (X=Cr, Al, or Fe, 0≤y≤1), $LiNi_{0.5-y}X_yMn_{1.5}O_4$ (X=Fe, Cr, Zn, Al, Mg, Ga, V, or Cu; 0≤y≤0.5), $xLi_2MnO_3·(1-x)LiM^{C1}_yM^{C2}_zM^{C3}_{1-y-z}O_2$ ($M^{C1}$, $M^{C2}$, and $M^{C3}$ independently are Mn, Ni, Co, Cr, Fe, or mixture thereof; x=0.3-0.5; y≤0.5; z≤0.5), $Li_2M^2SiO_4$ ($M^2$=Mn, Fe, or Co), $Li_2M^2SO_4$ ($M^2$=Mn, Fe, or Co), $LiM^2SO_4F$ ($M^2$=Fe, Mn, or Co), $Li_{2-x}(Fe_{1-y}Mn_y)P_2O_7$ (0≤y≤1), $Cr_3O_8$, $Cr_2O_5$. In an independent embodiment, the cathode may be a lithium conversion compound, such as LiF.

Exemplary cathode materials for sodium batteries include, but are not limited to, $NaFePO_4$, $Na_2FePO_4F$, $Na_2FeP_2O_7$, $Na_3V_2(PO_4)_3$, $Na_3V_2(PO_4)_2F_3$, $NaVPO_4F$, $NaVOPO_4F$, $Na_{1.5}VOPO_4F_{0.5}$, $NaCo_2O_4$, $Na_2Ti_3O_7$, and $Na_xMO_2$ where 0.4<x≤1, and M is a transition metal or a mixture of transition metals (e.g., $NaCrO_2$, $NaCoO_2$, $Na_xCoO_2$ (0.4≤x≤0.9), $Na_{2/3}Ni_{1/3}Mn_{2/3}O_2$, $Na_{2/3}Fe_{1/2}Mn_{1/2}O_2$, $Na_{2/3}Ni_{1/6}Co_{1/6}Mn_{2/3}O_2$, $NaNi_{1/3}Fe_{1/3}Mn_{1/3}O_2$, $NaNi_{1/3}Fe_{1/3}Co_{1/3}O_2$, $NaNi_{1/2}Mn_{1/2}O_2$, Prussian white analogue cathodes (e.g., $Na_2MnFe(CN)_6$ and $Na_2Fe_2(CN)_6$), Prussian blue analogue (PBA) cathodes ($Na_{2-x}M_a[M_b(CN)_6]_{1-y}·nH_2O$, wherein $M_a$ and $M_b$ independently are Fe, Co, Ni, or Cu, x=0 to 0.2, y=0 to 0.2, n=1 to 10).

Other sodium intercalation materials include $Na_4Ti_5O_{12}$, $Fe_3O_4$, $TiO_2$, $Sb_2O_4$, Sb/C composite, SnSb/C composite, BiSb/C composite, and amorphous P/C composite. In an independent embodiment, the cathode is a sodium conversion compound in which sodium displaces another cation, such as FeSe, $CuWO_4$, CuS, CuO, CuCl, or $CuCl_2$.

Exemplary cathode materials for potassium batteries include, but are not limited to, Prussian blue, Prussian blue analogues, $K_{0.5}MnO_2$, $K_{0.55}CoO_2$, $K_{0.48}Mn_{0.4}Co_{0.6}O_2$, $K_{0.85}Fe_{0.5}Mn_{0.5}O_2$, $K_3V_2(PO_4)_3$, $KVPO_4F$. potassium ferro/ferricyanide, potassium cobalt oxide (e.g., $K_{0.6}CoO_2$).

The separator may be glass fiber, a porous polymer film (e.g., polyethylene- or polypropylene-based material) with or without a ceramic coating, or a composite (e.g., a porous film of inorganic particles and a binder). One exemplary polymeric separator is a Celgard® K1640 polyethylene (PE) membrane. Another exemplary polymeric separator is a Celgard® 2500 polypropylene membrane. Another exemplary polymeric separator is a Celgard® 3501 surfactant-coated polypropylene membrane. The separator may be infused with an electrolyte, as disclosed herein.

In some embodiments, a rechargeable battery includes a lithium metal anode, a cathode suitable for a lithium battery as disclosed above, a separator, and a nonflammable electrolyte as disclosed herein. The rechargeable battery may be a pouch cell. Each of the salts comprises lithium cations. Exemplary lithium-based salts include, but are not limited to, LiFSI, LiTFSI, LiBETI, LiBOB, $LiPF_6$, $LiAsF_6$, $LiBF_4$, $CF_3SO_3Li$, $LiClO_4$, LiDFOB, $LiPO_2F_2$, LiI, LiBr, LiCl, LiSCN, $LiNO_3$, $LiNO_2$, $Li_2SO_4$, and combinations thereof.

Figure 3:
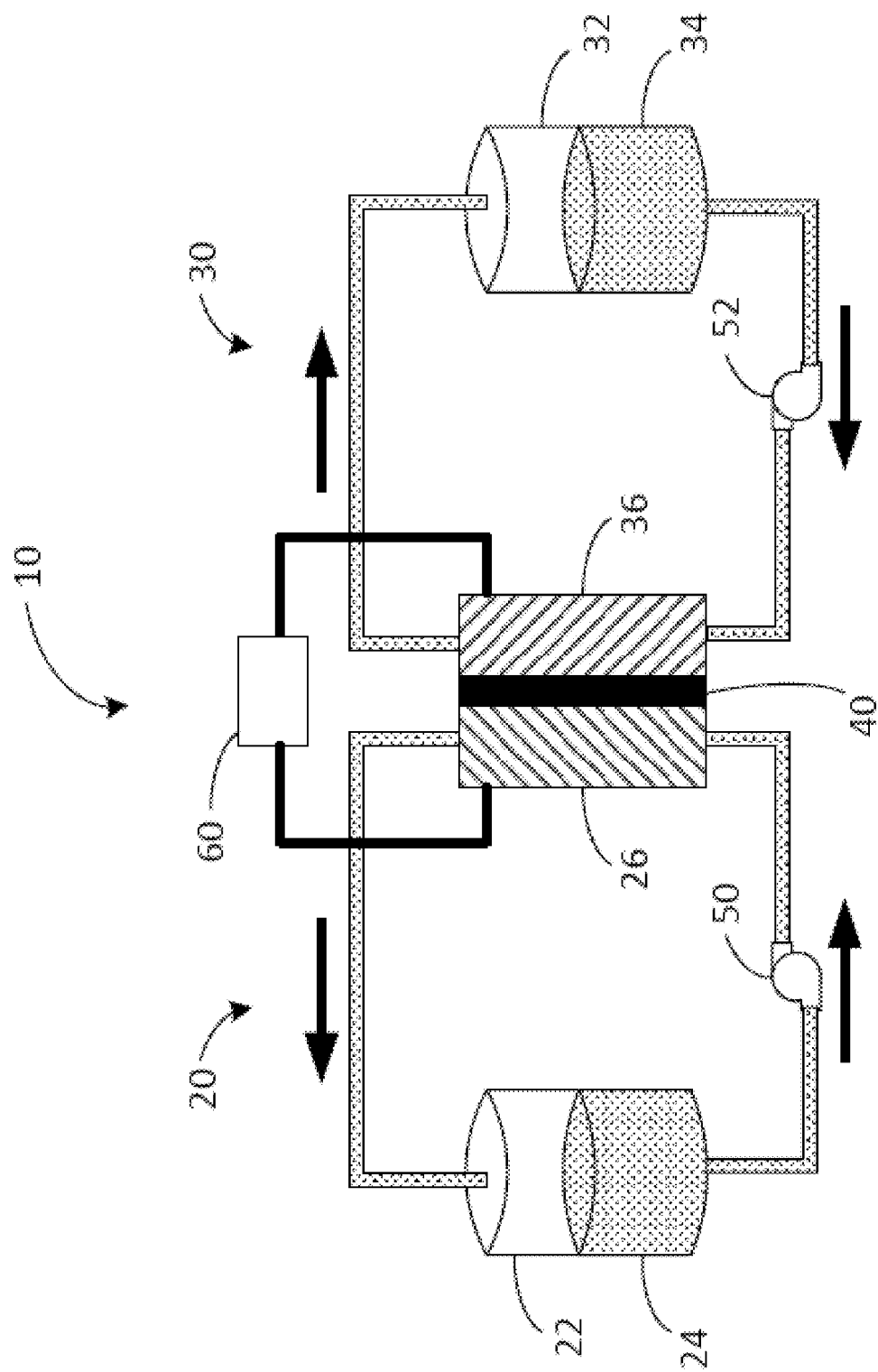
FIG. 3 is a schematic diagram of an exemplary redox flow battery system.

In some embodiments, the rechargeable battery is a non-aqueous redox flow battery (NRFB). Redox flow batteries can provide electrical energy converted from chemical energy continuously, and are promising systems for energy storage to integrate renewable energies (e.g., solar and/or wind energy) into electrical supply grids. As shown in FIG. 3, a typical RFB system 10 comprises a positive half-cell 20 and a negative half-cell 30. The half-cells are separated by a membrane or separator 40, such as an ion-exchange membrane (cation- or anion-exchange membrane), ion conductive membrane (polymer or ceramic) or porous separator. The positive half-cell 20 comprises an electrode tank 22 containing a catholyte 24 and the negative half-cell 30 comprises an electrode tank 32 containing an anolyte 34. The anolyte and catholyte are solutions comprising electrochemically active components in different oxidation states. The electrochemically active components in the catholyte and anolyte couple as redox pairs. The hydrofluorocarbon may be included in the catholyte or the anolyte. Exemplary cathode materials for NRFB include, but are not limited to, a metallocene (e.g., ferrocenylmethyl dimethyl ethyl ammonium bis(trifluoromethanesulfonyl)imide (Fc1N112-TFSI), a dialkoxybenzene (e.g., a 2,5-di-tert-butyl-1,4-dialkoxy benzene, 2,5-di-tert-butyl-1,4-bis(2-methoxyethoxy)benzene (DBBB)), a phenothiazine compound, a catechol ether compound, a catecholborane compound (e.g., a B-phenyl-catecholborane compound), a borane cluster compound (e.g., a lithium halogen-substituted borane cluster), a 1,3-benzodioxole compound, a benzodioxin compound, a carbonyl compound (e.g., 9-fluorenone (FL)), 1,4-di-alkoxybisphosphinyl benzene compound, a 1,4-phenylene diphosphate ester compound, an organic nitroxide radical (e.g., (2,2,6,6-Tetramethylpiperidin-1-yl)oxyl (TEMPO)), and a 5,10-dihydro-5,10-dialkylphenazine compound (e.g., 5,10-dihydro-1,5-dimethylphenazine). Non-limiting examples of anode materials include, a quinoxaline compound, a quinone compound, a ketone compound (e.g., dipyridyl ketone), an acylpyridine compound, a viologen compound (e.g., methyl viologen (MV), an anthraquinone compound, a phthalimide compound, (N-methylphthalimide), a phenazine compound, a thiadiazole compound (e.g., 2,1,3-benzothiadiazole (BzNSN)) or metal anode (e.g., Li, Na, K, Mg). During charging and discharging of the RFB, the catholyte and anolyte are continuously circulating via pumps 50, 52 through the positive and negative electrodes 26, 36, respectively, where redox reactions proceed, providing the conversion between chemical energy and electrical energy or vice-versa. To complete the circuit during use, positive and negative electrodes (including a current collector at each side) 26, 36 of the RFB system 10 are electrically connected through current collectors (not shown) with an external load 60.

In some embodiments, a battery including a nonflammable electrolyte as disclosed herein has a CE≥90%, such as ≥91%, ≥96%, ≥97%, ≥98%, ≥99%, ≥99.5%, or even ≥99.9%. The CE may be, for example, 90-94%, 95-100%, 96-100%, 97-100%, 98-100%, 99-100%, 99.5-100%, or 99.9-100%. Embodiments of batteries including nonflammable electrolytes as disclosed herein demonstrate stable cycling performance (e.g., as evidenced by a stable CE and/or specific capacity) over a period of at least 100 cycles, at least 150 cycles, or at least 200 cycles In some embodiments, the battery has a capacity retention of at least 80% for at least 175 cycles, at least 200 cycles, or at least 250 cycles, and/or a capacity retention of at least 75% for at least 175 cycles, at least 200 cycles, at least 250 cycles, or even at least 300 cycles. For example, the battery may demonstrate stable cycling performance for 100-300 cycles, such as 175-300 cycles, 200-300 cycles, or 225-300 cycles.

IV. Examples

Rechargeable Lithium Metal Battery

A HFC-based nonflammable electrolyte comprised of LiFSI, dimethoxyethane (DME) and 1H,6H-dodecafluorohexane (DH) with mole ratio of 1:1.2:3 was prepared. The electrolyte was denoted as DH47. The flashpoint of DH47 has tested up to 125° C. with a close cup method and no flash was observed (Table 1 below). DH47 has a flashpoint>93° C. and is considered as nonflammable electrolyte according to GHS classification criteria. Table. 1 shows flash point results for three electrolyte compositions that include HCP, DH, or one comparative fluoro compound (TIE).

TABLE 1

Flash Point Measurement Results

| | Electrolyte | EL code | Flash Point (° C.) | Notes |
|---|---|---|---|---|
| Electrolyte for Li | LIFSI/DME/TTE (1:1.2:3 mol ratio) | T47 | 28 | A flash was observed at 28°C, 35° C. and 40° C. but not at higher temperatures. (TTE has a flash point at 27.5 ° C.) |
| | LIFSI/DME/DH (1:1.2:3 mol ratio) | DH47 | >93 | Tested up to 125°C; no flash was observed. |
| Electrolyte for Si | LIFSI/DMC/HCP (1:1.2:3 mol ratio) +5% FEC | EL47C | >93 | Tested up to 95°C; no flash was observed |
| | LIFSI/(EMC/EC)/HCP (1:1.2:3 mol ratio) + 5% FEC | HCP104 | >93 | Tested up to 95°C; no flash was observed. |

TTE:
1,1,2,2-tetrafluoroethyl-2,2,3,3-tetrafluoropropylether

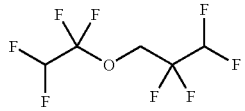 [SMILES: FC(F)C(F)(F)COC(F)(F)C(F)F]

Figure 4A:
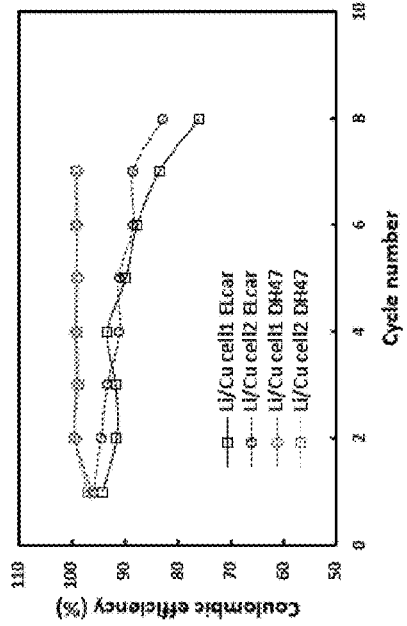
FIGS. 4A-4C are graphs showing that a Li metal battery having a DH-containing electrolyte exhibits high coulombic efficiency (CE), and good compatibility with Li metal.
Figure 4B:
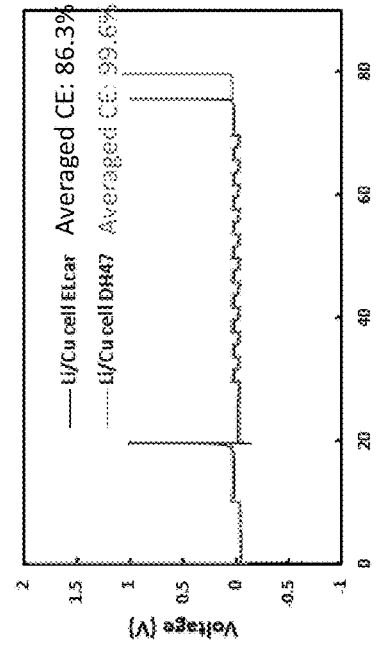
Figure 4C:
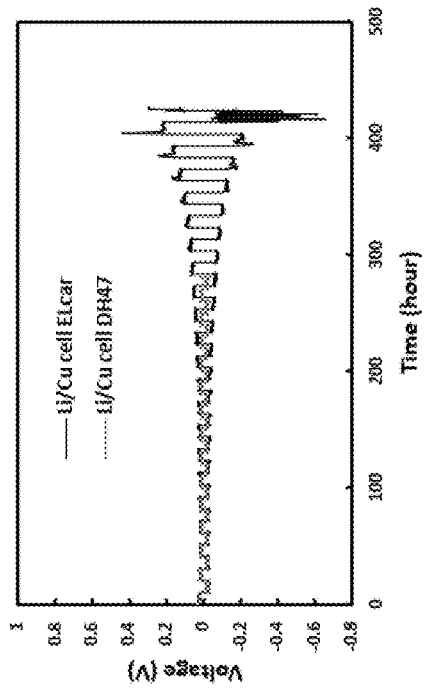

FIGS. 4A-4C shows the compatibility of Li metal with HFC-based electrolyte in Li/Cu and Li/Li 2032 coin cells. The averaged coulombic efficiency (CE) of the DH47 in Li/Cu half cell is very high, 99.6%, and is higher than 86.3% of the carbonated-based electrolyte, 1M $LiPF_6$ EC/EMC (3:7, v %)+2% VC (ELcar) (FIG. 4A). During the cycling in Li/Cu half cells, the CE is also high and up to 99.5% tested with an areal capacity of 3.5 mAh/cm$^2$ and a current density of 0.35 mA/cm$^2$ (FIG. 4B). In Li/Li symmetrical cells tested with an areal capacity of 3.5 mAh/cm$^2$ and a current density of 0.35 mA/cm$^2$ (FIG. 4C), the DH47 shows smaller polarization than ELcar. The high CE and low polarization demonstrate the superior compatibility of Li metal in HFC-based nonflammable electrolyte.

Figure 5:
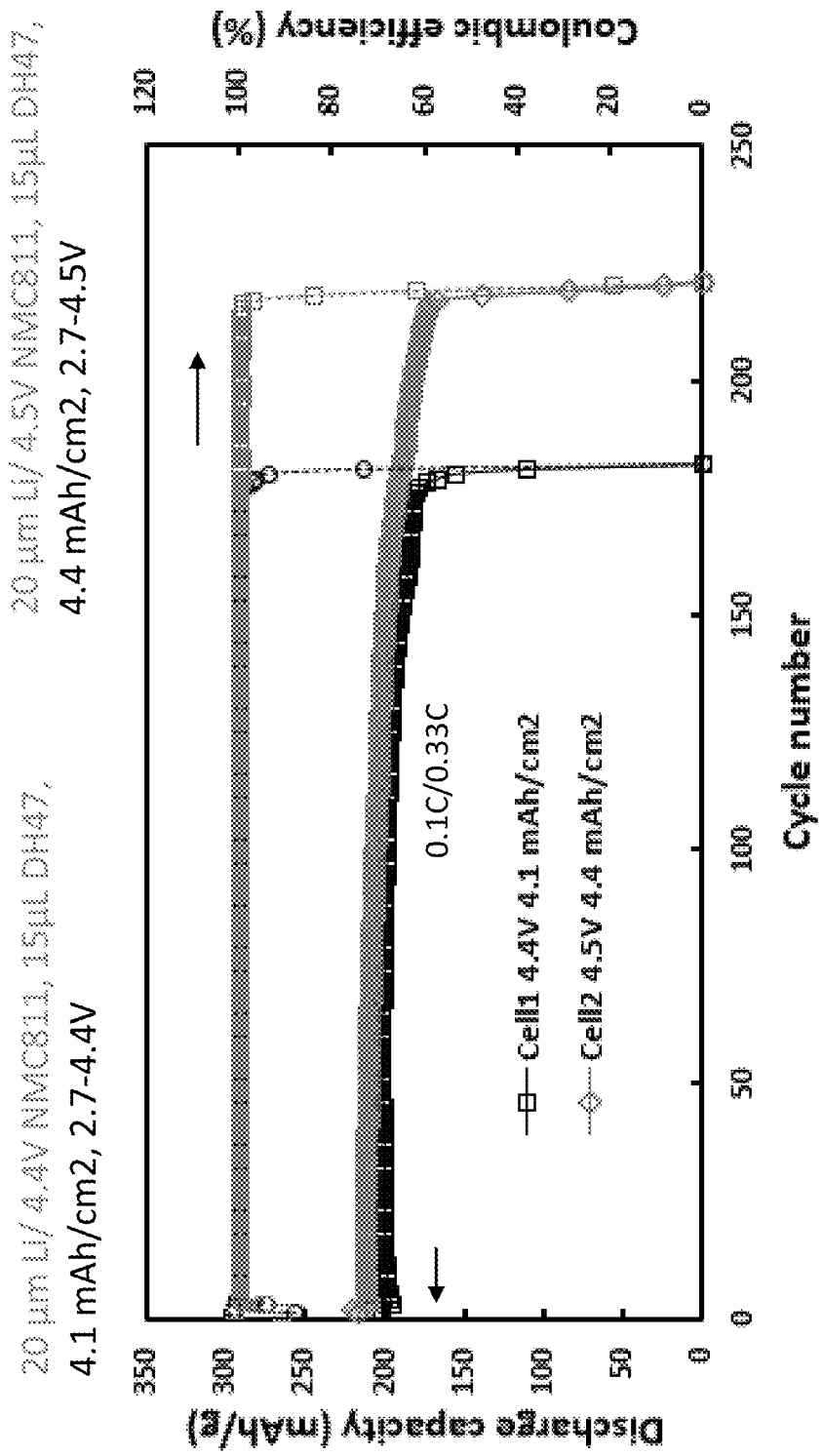
FIG. 5 is a graph showing that a Li metal battery having a DH-containing electrolyte exhibits stable cycling.

FIG. 5 shows the cycling performance of the 4.4V and 4.5V of $LiNi_{0.8}Mn_{0.1}Co_{0.1}O_2$ (NMC811) in 2032 coin cells with DH47 electrolyte under practical condition. The practical condition means the areal capacity of the Li metal battery should be higher than 3.0 mAh/cm$^2$ and deploys thin Li metal foil (less than 50 micron of thickness) and lean electrolyte, e.g., 15 μl electrolyte in each coin cell. The NMC811 electrode is a mixture of NMC811, PVDF binder and conductive carbon with a weight ratio of 96:2:2 coated on Al foil. Both of the two coin cells with DH47 electrolyte show >150 cycles tested at 0.1 C (charge)/0.33 C (discharge) at 2.7-4.4V and 2.7-4.5V.

Figure 6:
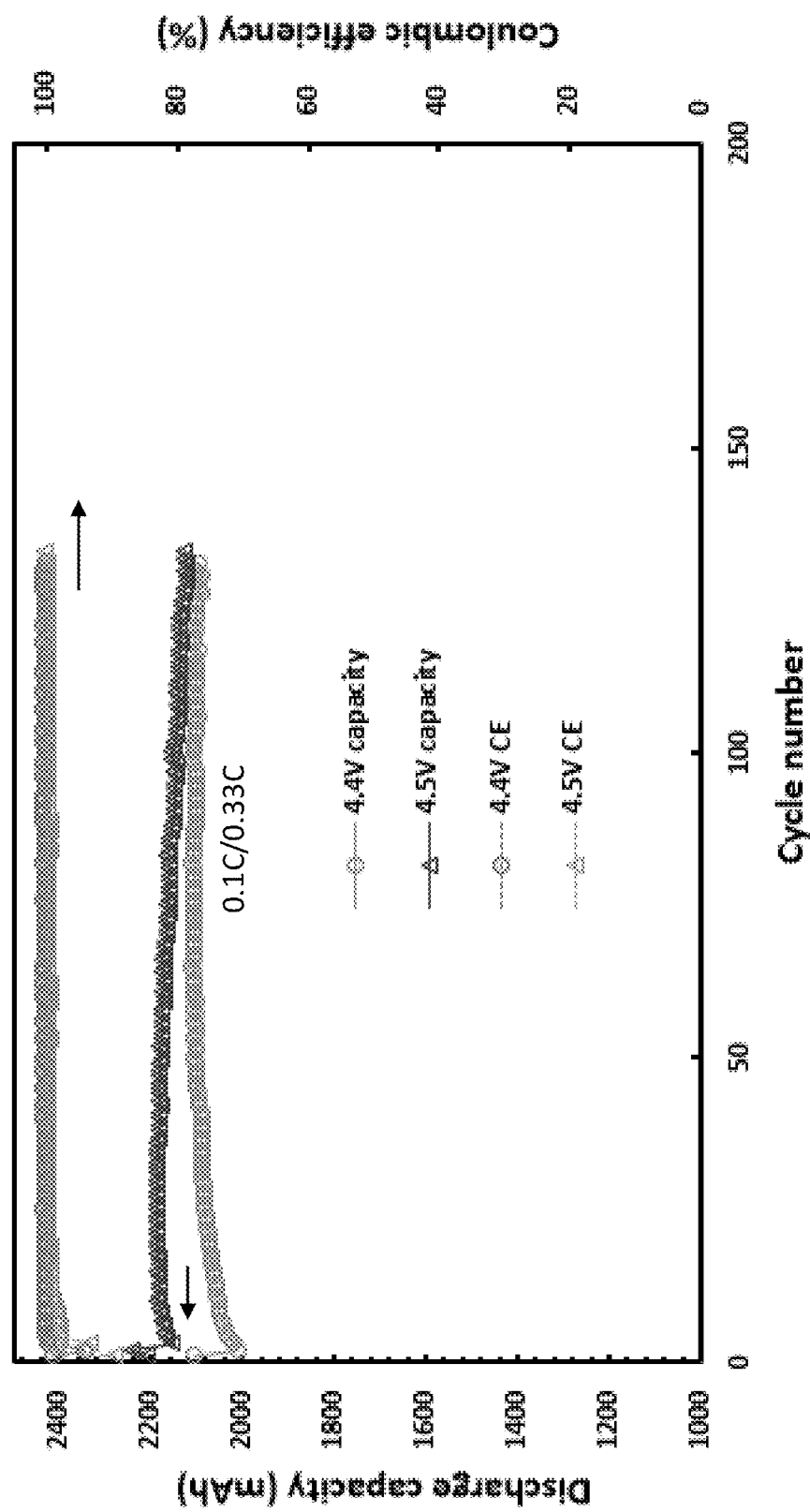
FIG. 6 is a graph showing that a Li metal pouch cell having a DH-containing electrolyte exhibits stable cycling.

FIG. 6 shows excellent cycling performance of two high energy density Li/NMC811 pouch cells with DH47 electrolyte. The energy density of the two pouch cells is 350 Wh/Kg and the capacity is 2 Ah. One cell was tested at 2.7-4.4V and another one was 2.7-4.5V. The pouch cell tested to 4.4V is very stable and no capacity fades at 130$^{th}$ cycle. The pouch cell tested to 4.5V shows slightly fast capacity fading at 130$^{th}$ cycle, ~98.7% of the capacity retention.

Figure 7:
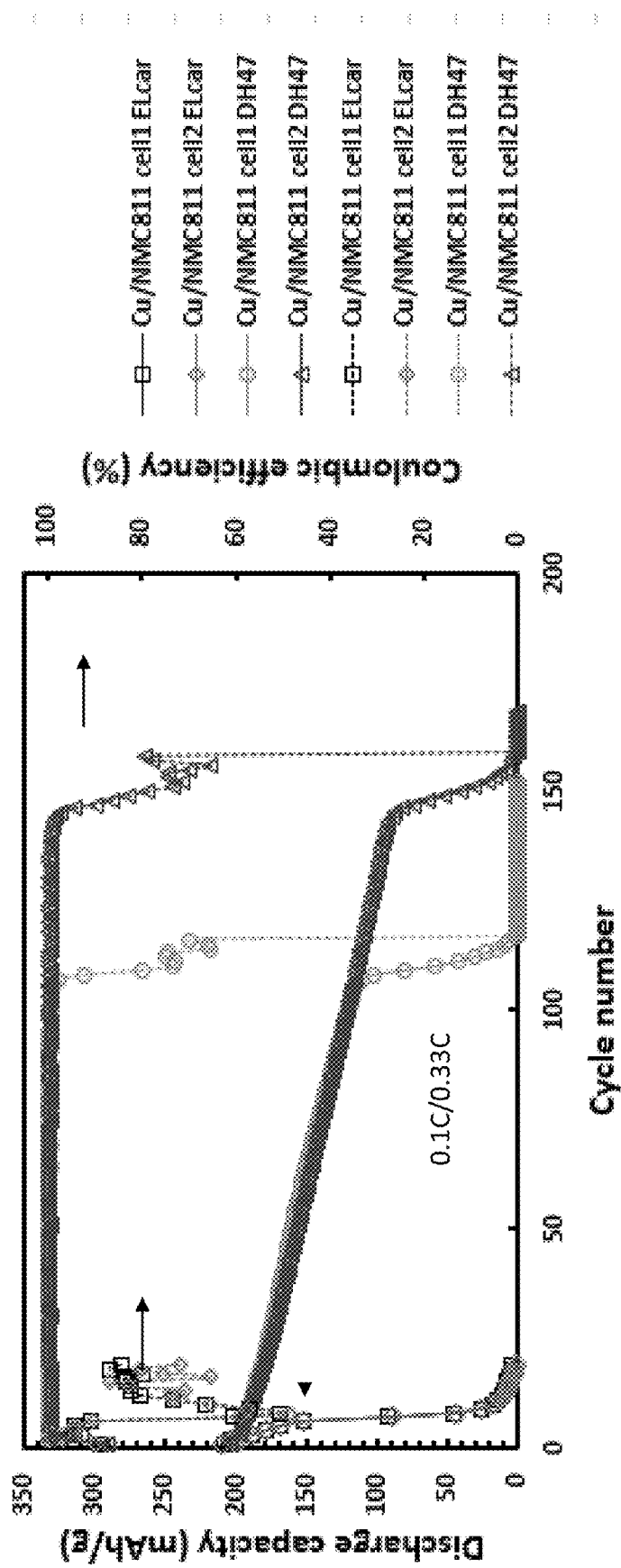
FIG. 7 is a graph showing that an anode-free battery having a DH-containing electrolyte exhibits superior cycling compared to a conventional electrolyte that includes only a carbonate solvent.

FIG. 7 shows the cycling performance of the anode-free Cu/NMC811 coin cells. At practical conditions, ~4.0 mAh/cm$^2$ and lean electrolyte, the cell with DH47 electrolyte enables >100 cycles while less than 30 cycles for ELcar electrolyte at 0.1 C/0.33 C, further suggesting the superior stability of HFC-based electrolyte with Li metal.

Rechargeable Lithium-Ion Battery

Figure 8:
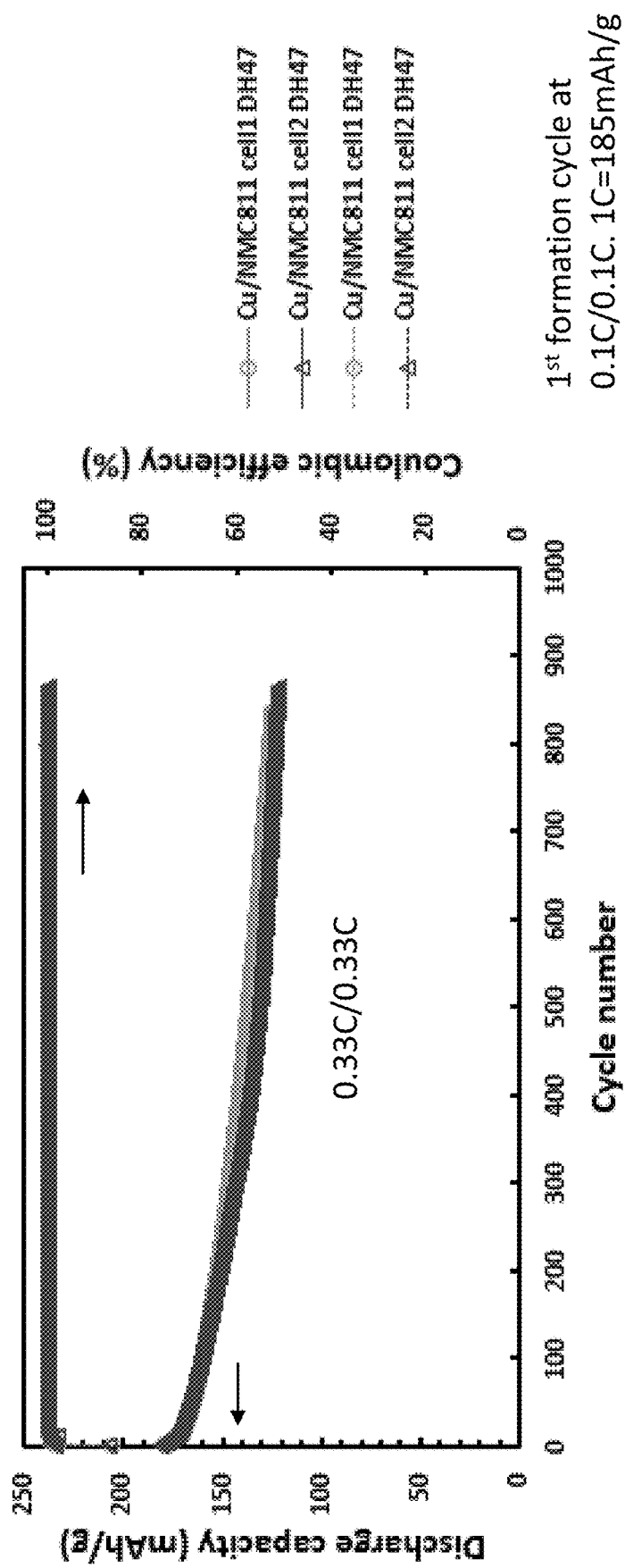
FIG. 8 is a graph showing that a Si-based lithium-ion battery having an HCP-containing electrolyte exhibits superior cycling compared to a conventional electrolyte that includes only a carbonate solvent.

Unlike a Li metal battery, the anode material in lithium-ion battery is graphite, Si or a mixture thereof. The application of the HFC-based electrolyte in lithium-ion batteries is also evaluated. FIG. 8 shows the cyclability of the two graphite/622 coin cells (2032 type) with DH47 electrolyte. The reversible area capacity is 2.5-2.8 mAh/cm² and 70 µL electrolyte is applied. Both the two coin cell with DH47 electrolytes presents stable cycling up to 800 cycles at 0.33 C/0.33 C between 2.7 and 4.35V, demonstrating the feasibility of the HFC-based electrolyte in lithium-ion battery.

Figure 9:
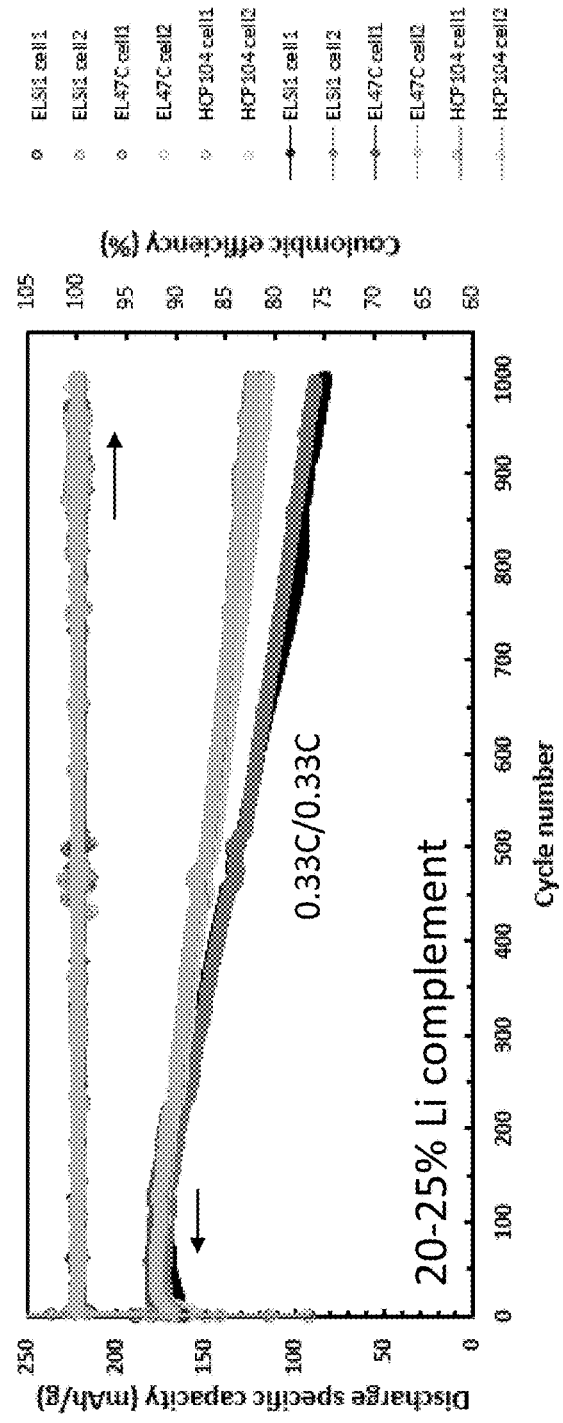
FIG. 9 is a graph showing that a graphite Li ion battery having a DH-containing electrolyte exhibits stable cycling.

FIG. 9 shows the cycling stability of Gr-Si/NMC622 coin cells (2032 type) with two HFC-based electrolyte and one carbonate-based electrolyte. One HFC-based nonflammable electrolyte denoted as EL47C is comprised of LiFSI, dimethyl carbonate (DMC) and 1H,1H,2H-heptafluorocyclopentane (HCP) with mole ratio of 1:1.2:3. Another HFC-based nonflammable electrolyte denoted as HCP104 has similar recipe as EL47C, the only difference is the DMC is replaced with a mixture of ethyl methyl carbonate (EMC) and ethylene carbonate (EC). The flashpoint of EL47C and HCP104 have tested up to 95° C. with a close cup method and no flash was observed (Table 1). Both EL47C and HCP104 have a flashpoint>93° C. and are considered as nonflammable electrolyte according to GHS classification criteria. Gr-Si/NMC622 coin cells are assembled to evaluate the cycling stability in these electrolytes. The Gr-Si electrode is a mixture of graphite, Si (PNNL self-prepared), polyimide binder and conductive carbon with a weight ratio of 38:50:8:4 coated on Cu foil. The NMC622 electrode is a mixture of NMC622, PVDF binder and conductive carbon with a weight ratio of 96:2:2 coated on Al foil. Prelithiation of Gr-Si electrode is deployed to reduce the large irreversible capacity at first formation cycle. The prelithiated Gr-Si electrodes are harvested from Li/Gr-Si 2032 coin cells discharged to 20-30% of the original capacity and then coupled with NMC622 electrodes to assemble the full cell with interested electrolyte. The testing voltage is controlled between 2.0 V and 4.38 V and the rate is 0.33 C/0.33 C. A control electrolyte, 1M LiPF$_6$ EC/DEC/EMC (1/1/1, by volume)+1% VC+5% FEC (denoted as ELSi1), is also tested. Two coin cells for each electrolyte are tested. The reversible areal capacity of the coin cells is 2.7-2.9 mAh/cm² and 70 µL electrolyte is applied. As it can be seen in FIG. 9, the coin cells with EL47C have capacity retention of 80% @550-560 cycle and 65%@1000 cycle while 80% @630-650 cycle and 71%@1000 cycle. The capacity retention of the coin cells with control electrolyte ELSi1 is 80% @440-460 cycle and 50%@1000 cycle. The HCP-based HFC nonflammable electrolytes have excellent cycling performance with Si-type lithium-ion battery.

Figure 10A:
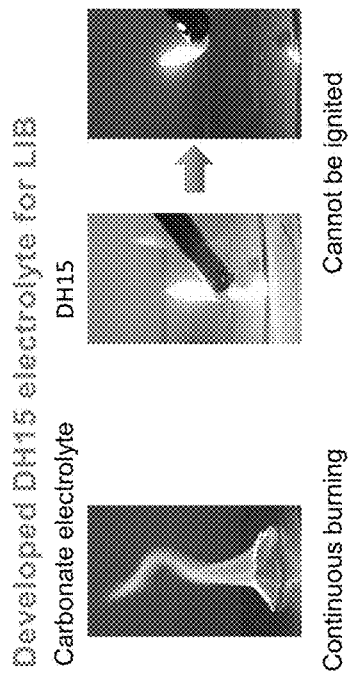
FIG. 10A shows that a DH-containing electrolyte for a graphite lithium-ion battery is nonflammable and has a flash point of >93° C.
Figure 10B:
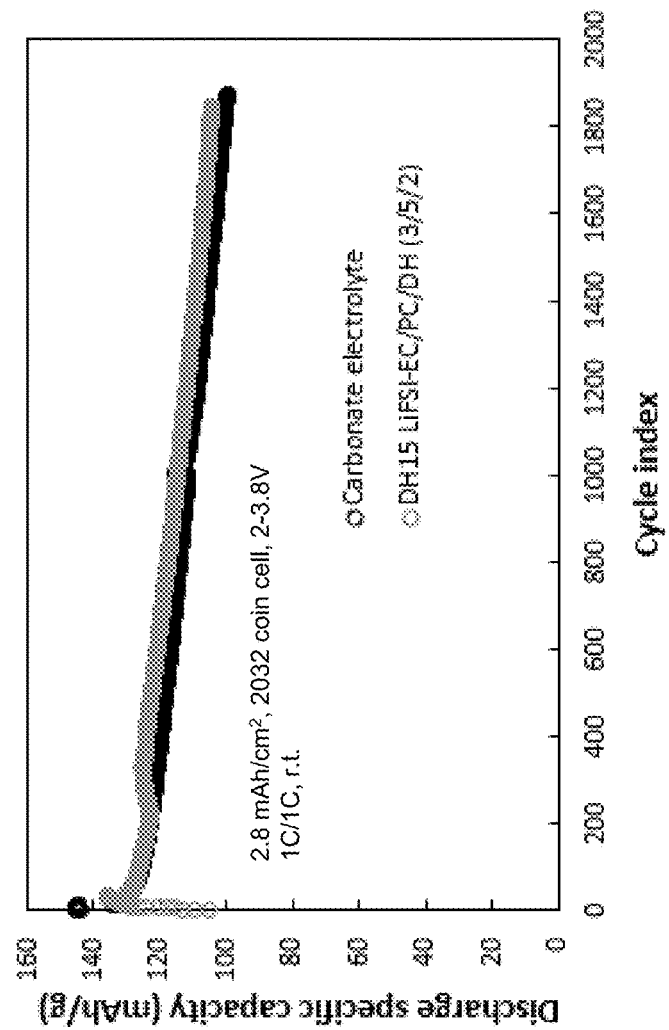
FIG. 10B is a graph showing that a graphite Li ion battery having a DH-containing electrolyte exhibits comparable cell performance to a commercial carbonate electrolyte, 80% at 1800 cycles.

FIGS. 10A and 10B show DH/EC/PC as cosolvents for graphite/LiFePO$_4$ (LFP) lithium ion battery. The electrolyte denoted as DH15 is comprised of 1M LiFSI in DH/EC/PC (2/3/5, by volume). The DH15 electrolyte cannot be ignited while continuous burning is observed with ELSi1 electrolyte (FIG. 10A). The LFP electrode is a mixture of LiFePO$_4$, PVDF and conductive carbon with a weight ratio of 92:4:4 coated on Al foil. The graphite electrode is a mixture of graphite, PVDF and conductive carbon with a weight ratio of 95:3:2 coated on Cu foil. The graphite electrode and LFP electrode are coupled to assemble 2032 coin cells with DH15 and ELSi1 electrolytes. The testing voltage is controlled between 2.0 V and 3.8 V and the rate is 1 C/1 C with 10 formation cycles at 0.1 C/0.1 C. The reversible areal capacity of the coin cells is 2.8 mAh/cm² and 70 µL electrolyte is applied. Similar as ELSi1 control electrolyte, the graphite/LFP coin cells shows superior cycling performance in DH15 nonflammable electrolyte. The capacity retention is 80% @ 1800 cycle.

Nonaqueous Redox Flow Battery

Figure 11A:
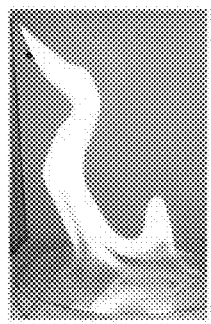
FIG. 11A shows that a HCP-containing electrolyte for a nonaqueous redox flow battery extinguishes in is even with a flash point around 28° C. The low flash point contributes by a small portion of highly flammable solvent (DME or AN) which is critical to the solubility of the TEMPO and salt.
Figure 11A:
Figure 11B:
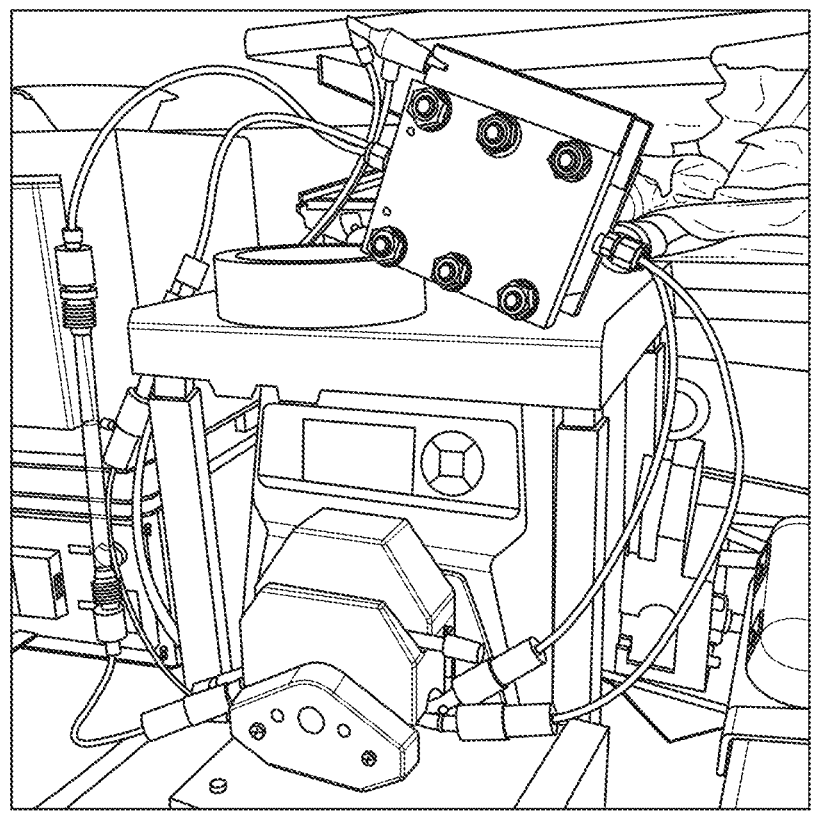
FIGS. 11B and 11C show that a Li/TEMPO hybrid nonaqueous redox flow battery cycled about 250 times with 70% EOL, demonstrating the feasibility in a safe electrolyte.
Figure 11C:
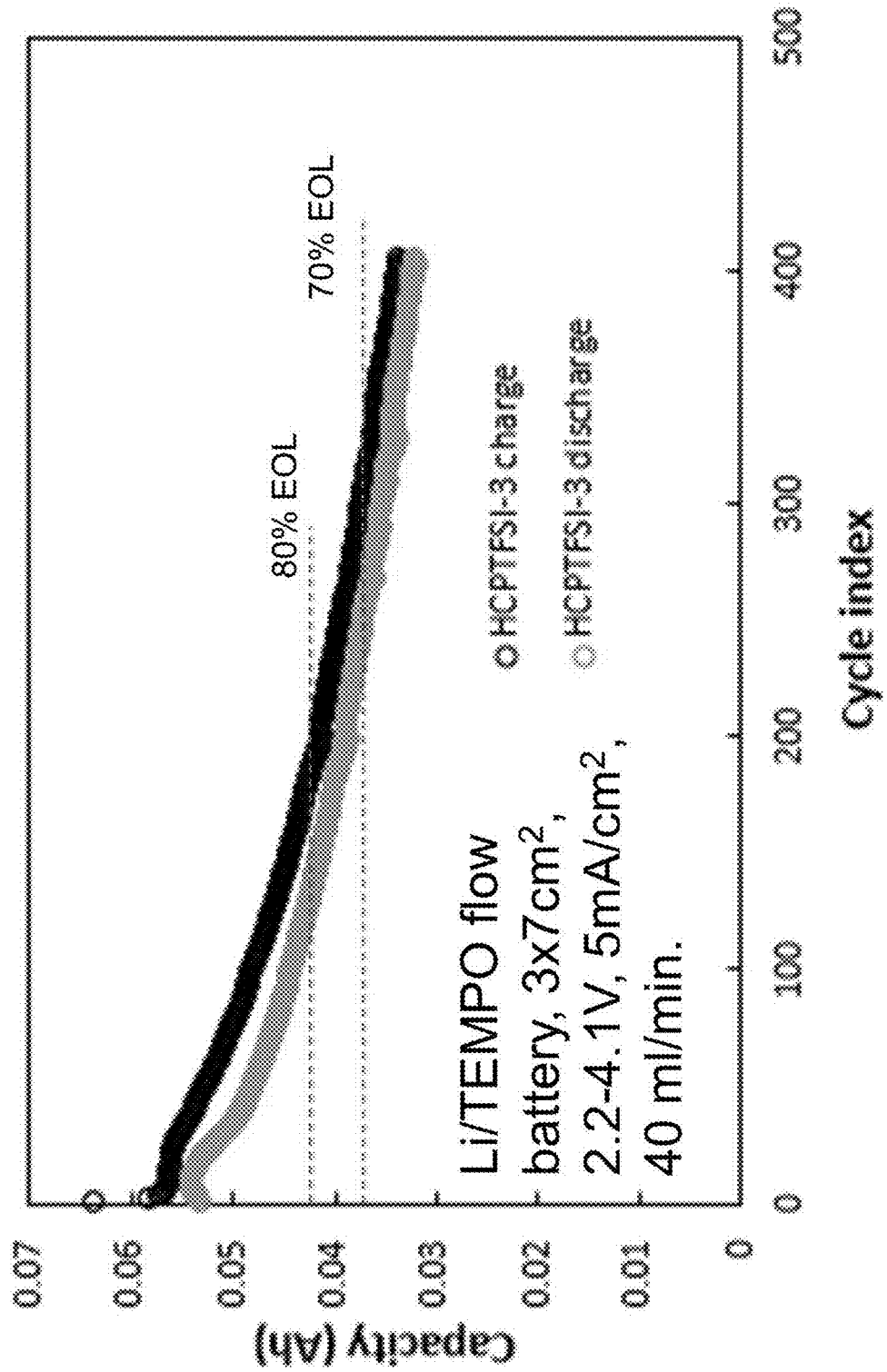

Nonaqueous redox flow battery is a potential technology for grid-level energy storage systems as its high energy density and wide electrochemical window. FIG. 11A shows the flammability test of a HCP-based HFC electrolyte (denoted as HCPTFSI-3) and a conventional 1M LiTFSI acetonitrile (AN) electrolyte. The HCPTFSI-3 electrolyte contains LiTFSI/DME/HCP with a 1:1.5:3 of mole ratio and 10 wt. % FEC. Even HCPTFSI-3 has a flash point around 28° C., the fire can be extinguished in one second while continuous burning for 1M LiTFSI AN electrolyte (FIG. 11A). HCPTFSI-3 presents a low flammability comparing with conventional electrolyte. FIG. 11B shows a Li metal/TEMPO hybrid redox flow battery. The catholyte is 0.1 mol/Kg TEMPO in HCPTFSI-3 electrolyte. The anolyte is same as catholyte, but the active material is Li metal. The flow battery comprised of cell block/graphite felt/Polyolefin separator/Li metal/graphite felt/cell block is clamped with two stainless steel plates. There are 20 g catholyte and 14 g anolyte in the flow battery. The active areal of the cell is 21 cm². Under 5 mA/cm² of current density and 40 ml/min of flow speed, the cell tested at 2.0-4.1 V delivers a 52 mAh of reversible capacity and good cycling performance, 80% of capacity retention at 130$^{th}$ cycle and 70% at 250$^{th}$ cycle (FIG. 11C).

In view of the many possible embodiments to which the principles of the disclosed invention may be applied, it should be recognized that the illustrated embodiments are only preferred examples of the invention and should not be taken as limiting the scope of the invention.

What is claimed is:

1. A nonaqueous redox flow battery system, comprising:
   an anolyte;
   a catholyte; and
   an ion-exchange membrane or porous separator,
   wherein at least one of the anolyte or the catholyte comprises a solution comprising a solvent portion that comprises a first solvent and a second solvent, wherein the first solvent is a fluorohexane or a fluorocyclohexane.

2. The battery system of claim 1, wherein the first solvent is 1H,6H-dodecafluorohexane, or 1,1,2,2,3,3,4,4,5,5-decafluorocyclohexane.

3. The battery system of claim 1, wherein the second solvent is at least one carbonate.

4. The battery system of claim 1, wherein the second solvent comprises ethylene carbonate (EC), dimethyl carbonate (DMC), vinylene carbonate (VC), fluoroethylene carbonate (FEC), difluoroethylene carbonate (DFEC), trifluoroethylene carbonate (TFEC), vinyl ethylene carbonate (VEC), 4-methylene ethylene carbonate (MEC), propylene carbonate (PC), ethyl methyl carbonate (EMC), diethyl carbonate (DEC), methyl 2,2,2-trifluoroethyl carbonate (MFEC), dimethoxyethane (DME), 1,3-dioxolane (DOL), tetrahydrofuran (THF), allyl ether, triethyl phosphate (TEP), trimethyl phosphate (TMP), tributyl phosphate, triphenyl phosphate, tris(2,2,2-trifluoroethyl) phosphate, bis(2,2,2-trifluoroethyl) methyl phosphate, triphenyl phosphite, tris(2,2,2-trifluoroethyl) phosphite; dimethyl methylphosphonate, diethyl ethylphosphonate, diethyl phenylphosphonate, bis(2,2,2-trifluoroethyl) methylphosphonate; hexamethylphosphoramide; hexamethoxyphosphazene, hexafluorophosphazene, dimethyl sulfoxide (DMSO), dimethyl sulfone (DMS), ethyl methyl sulfone (EMS), ethyl vinyl sulfone (EVS), tetramethylene sulfone (TMS), trifluoromethyl ethyl sulfone (FMES), trifluoromethyl isopropyl sulfone (FMIS), trifluoropropyl methyl sulfone (FPMS), diethylene glycol dimethyl ether (diglyme), triethylene glycol dimethyl ether (triglyme), tetraethylene glycol dimethyl ether (tetraglyme), methyl butyrate, ethyl propionate, gamma-butyrolactone, acetonitrile (AN), succinonitrile (SN), adiponitrile, triallyl amine, triallyl cyanurate, triallyl isocyanurate, or any combination thereof.

5. The battery system of claim 4, wherein the first solvent is 1H,6H-dodecafluorohexane or 1,1,2,2,3,3,4,4,5,5-decafluorocyclohexane.

6. The battery system of claim 1, wherein the solution has a flashpoint>93° C.

7. The battery system of claim 1, wherein the anolyte comprises a quinoxaline compound, a quinone compound, a ketone compound, an acylpyridine compound, a viologen compound, an anthraquinone compound, a phthalimide compound, a phenazine compound, a thiadiazole compound or metal anode.

8. The battery system of claim 7, wherein the catholyte comprises a metallocene, a dialkoxybenzene, a phenothiazine compound, a catechol ether compound, a catecholborane compound, a borane cluster compound, a 1,3-benzodioxole compound, a benzodioxin compound, a carbonyl compound, a 1,4-dialkoxybisphosphinyl benzene compound, a 1,4-phenylene diphosphate ester compound, an organic nitroxide radical, or a 5,10-dihydro-5,10-dialkylphenazine compound.

9. The battery system of claim 8, wherein the first solvent is 1H,6H-dodecafluorohexane or 1,1,2,2,3,3,4,4,5,5-decafluorocyclohexane.

10. The battery system of claim 1, wherein the catholyte comprises a metallocene, a dialkoxybenzene, a phenothiazine compound, a catechol ether compound, a catecholborane compound, a borane cluster compound, a 1,3-benzodioxole compound, a benzodioxin compound, a carbonyl compound, a 1,4-dialkoxybisphosphinyl benzene compound, a 1,4-phenylene diphosphate ester compound, an organic nitroxide radical, or a 5,10-dihydro-5,10-dialkylphenazine compound.

11. The battery system of claim 1, wherein the first solvent is from 10 vol % to 90 vol % of the solvent portion of the solution.

12. The battery system of claim 1, wherein the first solvent is from 20 vol % to 50 vol % of the solvent portion of the solution.

13. The battery system of claim 1, wherein the first solvent is from 70 vol % to 75 vol % of the solvent portion of the solution.

14. The battery system of claim 1, wherein the first solvent is from 75 vol % to 85 vol % of the solvent portion of the solution.

* * * * *